United States Patent Office 3,297,729
Patented Jan. 10, 1967

3,297,729
PREPARATION OF 17α-ESTERS OF 17α-HYDROXY-3-KETO-Δ⁴-PREGNENES
Franco Mancini and Roberto Sciaky, Milan, Italy, assignors to Societa Farmaceutici Italia, Milan, Italy, a corporation of Italy
No Drawing. Filed Mar. 30, 1965, Ser. No. 444,072
Claims priority, application Italy, Apr. 3, 1964, 7,173/64
5 Claims. (Cl. 260—397.4)

Our invention relates to a new process for preparing 17α-esters of 17α-hydroxy-3-keto-Δ⁴-pregnenes with an aliphatic organic acid having from 2 to 8 carbon atoms. The compounds which may be prepared according to the present invention are known to be useful in therapy as progestatives and display a good antiinflammatory, antirheumatic and antiallergic activity.

The following are some known methods for esterifying the hydroxy group in 17-position of steroids of the pregnane series:

U.S. Patent No. 2,753,360 describes the esterification of the 17α-hydroxyprogesterone with the anhydride of a suitable organic acid in the presence of p-toluenesulfonic acid wherein the reaction is carried out at room temperature and selectively saponifying the 3-position of the steroid $\Delta^{3,5}$-pregnadiene-3,17α-diol-20-one 3,17 - diacyl derivatives which are formed during the esterification.

British Patent No. 868,303 also describes the esterification of the tertiary alcohol group in 17-position of 6-alkyl-17α-hydroxy-progesterone with the anhydride of a suitable organic acid by carrying out the reaction in the presence of an acid catalyst such as p-toluene-sulfonic acid or halogenidric acids and then selectively saponifying the resulting 3-enol-esters with a mineral acid.

U.S. Patent No. 3,061,616 also describes a method which, however, does not avoid the formation of the 3,17-diacyl derivatives of $\Delta^{3,5}$-pregnadiene-3,17α-diol-20-one formed during the esterification of the tertiary hydroxy group in 17α-position.

None of the above-mentioned patents describes a method which is satisfactory for carrying out the esterification of the tertiary alcohol group in 17-position of the 17α-hydroxy-3-keto-Δ⁴-pregnenes. In the above patents, the esterification of the hydroxy group in 17-position is accompanied by a contemporary formation of the 3,17-diesters which must be followed by a saponification to restore the 3-keto group. The processes of these known techniques, therefore, have the disadvantage that a selective hydrolysis must be carried out after the esterification. This naturally lowers the yield of the process.

An object of this invention is to overcome this disadvantage. The esterification of the hydroxy group in 17 - position of the 17α-hydroxy-3-keto-Δ⁴-pregnenes is carried out by the action of a complex formed by a metalloid pentachloride selected from the group consisting of phosphorus and antimony and by the chloride of the organic aliphatic acid having from 2 to 8 carbon atoms as esterifying agent. The new process shows great advantages in comparison with known processes: (1) the reaction is performed in a single step, (2) with a single end product and (3) high yields of the end product.

To make the complex, a pentachloride selected from the group consisting of phosphorus pentachloride and antimony pentachloride, preferably antimony pentachloride, is used. The reaction is carried out under anhydrous conditions in the cold, preferably between 0° and 5° C., by adding the organic acid halide to the metalloid halide (1:1) dissolved in a halogenated aliphatic solvent selected from the group consisting of chloroform, carbon tetrachloride, dichloroethane, trichloroethylene and the analogues. The above-mentioned complex separates from the solution as crystalline precipitate and is generally employed as such for the esterification of the steroid.

The esterification is preferably carried out by adding the steroid to a solution of the complex in a lower nitroparaffin solvent which has a high dielectric constant; for example, nitromethane, nitroethane, or nitropropane, and preferably nitromethane. Generally 1 to 3 equivalents of the acylating complex, preferably 1.5 equivalents, with respect to the starting steroid are employed. The reaction starts at once in the cold, at a temperature between −30° C. and +5° C., and is preferably completed at between −15° C. and room temperature in from 30 minutes to some hours. When the reaction is over, the complex may be decomposed by adding an aqueous solution of an alkali metal acetate. The mass is then diluted with a chlorinated organic solvent, for example chloroform, The organic layer is then washed with an aqueous solution of an alkali metal bicarbonate, with water, and dried over anhydrous sodium sulfate. By evaporation of the solvent, the crude 17α-acyl-derivate is obtained, from which by recrystallization from an organic solvent, pure 17α-acyloxy-3-keto-Δ⁴-pregnene is recovered.

Typical examples of 17α-hydroxy-3-keto-Δ⁴-pregnenes, which may be esterified in 17-position by the process of the invention, are:

Δ⁴-pregnene-17α-ol-3,20-dione;
6α-methyl-Δ⁴-pregnene-17α-ol-3,20-dione;
6α-ethyl-Δ⁴-pregnene-17α-ol-3,20-dione;
$\Delta^{1,4}$-pregnadiene-17α-ol-3,20-dione;
Δ⁴-pregnene-17α,21-diol-3,11,20-trione;
6α-methyl-Δ⁴-pregnene-17α,21-diol-3,11,20-trione;
6-methyl-$\Delta^{4,6}$-pregnadiene-17α-ol-3,20-dione;
$\Delta^{1,4}$-pregnadiene-17α,21-diol-3,11,20-trione;
Δ⁴-pregnene-11β,17α,21-triol-3,20-dione;
6α-methyl-Δ⁴-pregnene-11β,17α,21-triol-3,20-dione;
6-chloro-$\Delta^{4,6}$-pregnadiene-17α-ol-3,20-dione;
$\Delta^{1,4}$-pregnadiene-11β,17α,21-triol-3,20-dione;
9α-fluoro-Δ⁴-pregnene-17α,21-diol-3,11,20-trion;
9α-fluoro-6α-methyl-Δ⁴-pregnene-17α,21-diol-3,11,20-trione;
9α-fluoro-6α-ethyl-Δ⁴-pregnene-17α,21-diol-3,11,20-trione;
9α-fluoro-$\Delta^{1,4}$-pregnadiene-17α,21-diol-3,11,20-trione;
$\Delta^{4,9,(11)}$-pregnadiene-17α-ol-3,20-dione;
$\Delta^{4,9(11)}$-pregnadiene-17α,21-diol-3,20-dione;
9α-fluoro-Δ⁴-pregnene-11β,17α,21-triol-3,20-dione and their 21-acyloxy derivatives. Steroids containing hydroxy groups in the molecule other than that in the 17α-position have these acylated too.

Typical examples of acylating agents which may be employed in the invention are the chlorides of the following acids: acetic, propionic, butyric, isobutyric, valeric, isovaleric, hexanoic, heptanoic, octanoic, phenylacetic, hemisuccinic, β-dimethylglutaric, acrylic, crotonic and phenoxy-acetic acids.

The following examples are to illustrate the invention, without limiting it.

*Example 1.—17α-acetoxyprogesterone*

The complex [CH₃CO]⁺SbCl₆⁻ is prepared by adding 0.35 cc. of acetyl chloride to a solution of 0.57 cc. antimony pentachloride in 3 cc. of anhydrous trichloroethylene, externaly cooled with ice, and stirring at 0°–5° C. for 45 minutes. The reaction is carried out under anhydrous conditions. The precipitate is dissolved in 5 cc. of nitromethane and to the solution 1 g. of 17α-hydroxyprogesterone is added. The reaction mixture is kept agitated for 15 minutes at 0°–5° C. and for 45 minutes at room temperature. Stirring is maintained and to the mixture 2.2 g. of sodium acetate dissolved in 6 cc. of water are added. The mixture is stirred for an additional 15 minutes. The mixture is diluted with chloroform and the organic layer, which separates out, is washed with a 5% solution of sodium bicarbonate in water. After drying over anhydrous sodium sulfate, the solvent is distilled off under reduced pressure and the residue is recrystallized from methanol. Two crops totalling 0.880 g. of 17α-acetoxyprogesterone, melting at 238–240° C., are obtained.

*Example 2.—6α-methyl-17α-acetoxyprogesterone*

The complex $[CH_3CO]^+SbCl_6^-$ is prepared as in Example 1 from 1.1 cc. of antimony pentachloride, 0.63 cc. of acetyl chloride in 6 cc. of trichloroethylene and dissolved in 8 cc. of nitromethane. To this solution, 2 g. of 6α-methyl-17α-hydroxyprogesterone are added at 0–5° C. and allowed to react for 45 minutes while externally cooled with ice. The mixture is mixed with 5 g. of sodium acetate in 10 cc. of water and diluted with chloroform. The extraction is carried out as in Example 1 and the residue, after crystallization, gives 1.55 g. of 6α-methyl-17α-acetoxyprogesterone.

*Example 3.—17α-hydroxyprogesterone hexanoate*

A complex is prepared by adding to a solution of 0.27 cc. of antimony pentachloride in 3 cc. of anhydrous chloroform cooled to 0–5° C. and stirred, 0.3 cc. of hexanoyl chloride and keeping the mixture externally cooled with ice for 45 minutes. The precipitate is dissolved in 3 cc. of nitromethane and 0.5 g. of 17α-hydroxyprogesterone are added to the solution. The mixture is then stirred for 2 hours at 0–5° C., and allowed to react at room temperature for 30 minutes with 2 g. of sodium acetate dissolved in 10 cc. of water. The mixture is diluted with chloroform and the organic layer is separated vigorously shaken with a 10% sodium bicarbonate solution in water, dried over anhydrous sodium sulfate, and the solvent distilled off under reduced pressure. The residue crystallizes from diethyl ether/n. hexane and 0.300 g. of 17α-hydroxy progesterone hexanoate, melting at 90–100° C., are obtained. Further crystallizations give 0.220 g. of the compound, melting at 118–120° C.

*Example 4.—6α-methyl-17α-hydroxyprogesterone hexanoate*

A complex is prepared as in Example 3 from 4 cc. of chloroform, 0.4 cc. of antimony pentachloride and 0.45 cc. of hexanoyl chloride and dissolved in 4 cc. of nitromethane to which 1 g. of 6α-methyl-17α-hydroxyprogesterone is added. The mixture is allowed to react for 2 hours at 0–5° C., mixed with sodium acetate, extracted and washed with sodium bicarbonate and water, evaporated in vacuo to dryness and the residue is crystallized from methanol. After crystallization 0.8 g. of 6α-methyl-17α-hydroxyprogesterone hexanoate, melting at 102–104° C., are obtained.

*Example 5.—$\Delta^4$-pregnene-17α,21-diol-3,11-trione diacetate*

A complex is prepared, as in Example 3, from 7 cc. of trichloroethylene, 1 cc. of antimony pentachloride and 0.6 cc. of acetyl chloride with stirring at 0–5° C. for 45 minutes. The complex is dissolved in 7 cc. of nitromethane and 1 g. of $\Delta^4$-pregnene-17α,21-diol-3,11,20-trione 21-acetate is added. The reaction is allowed to continue for 3 hours at 0–5° C. By extracting as above and by crystallization from methanol, 0.72 g. of $\Delta^4$-pregnene-17α,21-diol-3,11,20-trione diacetate (cortisone diacetate), melting at 218–220° C., are obtained.

*Example 6.—$\Delta^4$-pregnene-11β,17α,21-triol-3,20-dione triacetate*

A complex is prepared, as in Example 3, from 5 cc. chloroform, 0.7 cc. of antimony pentachloride and 0.4 cc. acetyl chloride and dissolved in 5 cc. of nitromethane. The solution is cooled to −10° to −15° C., and 1 g. of $\Delta^4$-pregnene-11β,17α,21-triol-3,20-dione 21-acetate is added with stirring for 4 hours at −15° C. After addition of an aqueos sodium acetate solution and diluting with chloroform, an organic layer separates which is washed with an aqueous solution of sodium bicarbonate and water. After evaporating off the solvent, the residue is taken up with a small amount of diethyl ether and 0.8 g. of hydrocortisone triacetate, melting at 146–149° C., is obtained. This compound recrystallized from acetone/diethyl ether/petroleum ether melts at 152–154° C.; $[\alpha]_D^{22°} = +96° \pm 2$ (chloroform).

The same product is also obtained by carrying out the reaction at −15° C. using as starting material $\Delta^4$-pregnene-11β, 17α,21-triol-3,20-dione, the molar ratio steroid-complex being 1:3.5.

*Example 7.—9α-fluoro-$\Delta^4$-pregnene-17α,21-diol-3,11, 20-trione diacetate*

A complex is prepared as above from 6 cc. of trichloroethylene, 1.1 cc. of antimony pentachloride and 0.63 cc. of acetyl chloride. After 40 minutes at 0°–5° C., the precipitate is dissolved in 8 cc. of nitromethane. Then 2.45 g. of 9α-fluoro-$\Delta^4$ pregnene-17α,21-diol-3,11, 20-trione 21-acetate are added and the mixture is allowed to stand for 2 hours at room temperature with stirring. After the extraction and purification procedure as in Example 3, 1.80 g. of 9α-fluoro-$\Delta^4$-pregnene-17α,21-diol-3,11,20-trione diacetate, melting at 265–269° C., are obtained.

*Example 8.—9α-fluoro-$\Delta^4$-pregnene-11β,17α,21-triol-3,20-dione triacetate*

A complex is prepared as above from 12 cc. of chloroform, 2.4 cc. of antimony pentachloride and 1.35 cc. of acetyl chloride. After 45 minutes at 0° to 5° C., the precipitate is dissolved in 12 cc. of nitromethane and 3 g. of 9α-fluoro-$\Delta^4$-pregnene-11β,17α,21-triol-3,20-dione 21-acetate in benzene are added. The mixture is kept stirred at 0° to 5° C. for 3 hours. After the extraction and purification procedure as in Example 3 and crystallization from acetone/diethyl-ether, 2.5 g. of 9α-fluoro-$\Delta^4$-pregnene-11β, 17α,21-triol-3,20-dione triacetate, melting at 208–210° C., are obtained.

*Example 9.—17α-hydroxyprogesterone propionate*

Operating as in Example 1, but employing as starting material 17α-hydroxyprogesterone and as a component of the acylation complex, propionic acid chloride; 17α-hydroxyprogesterone propionate, melting at 160–162° C., is obtained.

*Example 10.—17α-hydroxyprogesterone butyrate*

Operating as in Example 1, but employing as starting material 17α-hydroxyprogesterone and as a component of the acylation complex, butyric acid chloride; 17α-hydroxyprogesterone butyrate, melting at 123.5–124.5 C., is obtained.

*Example 11.—17α-hydroxyprogesterone valerate*

Operating as in Example 1, but employing as starting material 17α-hydroxyprogesterone and as a component of the acylation complex, valeric acid chloride; 17α-hydroxyprogesterone valerate, melting at 137–139° C., is obtained.

*Example 12.—17α-hydroxyprogesterone caprylate*

Operating as in Example 1, but employing as starting material 17α-hydroxyprogesterone and as a component of the acylation complex, caprylic acid chloride; 17α-hydroxyprogesterone caprylate, melting at 75–75.5° C., is obtained.

*Example 13.—$\Delta^{1,4}$-pregnadiene-17α,21-diol-3,11, 20-trione diacetate*

Operating as in Example 1, but employing as starting material $\Delta^{1,4}$-pregnadiene-17α,21-diol-3,11,20-trione and as a component of the acylation complex, acetic acid chloride; Δ¹,⁴-pregnadiene-17α,21-diol-3,11,20-trione diacetate, melting at 202–204° C., is obtained.

*Example 14.—6-chloro-Δ⁶-17α-hydroxyprogesterone acetate*

Operating as in Example 1, but employing as starting material 6-chloro-Δ⁶-17α-hydroxyprogesterone and as a component of the acylation complex, acetic acid chloride; 6-chloro-Δ⁶-17α-hydroxyprogesterone acetate, melting at 212–214° C., is obtained.

*Example 15.—6-methyl-Δ⁶-17α-hydroxyprogesterone acetate*

Operating as in Example 1, but employing as starting material 6-methyl-Δ⁶-17α-hydroxyprogesterone and as a component of the acylation complex, acetic acid chloride; 6-methyl-Δ⁶-17α-hydroxyprogesterone acetate, melting at 218–220° C. is obtained.

By operating in the same manner as described above, but employing the isologue complex consisting of PCl₅ instead of SbCl₅, analogous results are obtained.

*Example 16.—Δ¹,⁴-pregnadiene-11β,17α,21-triol-3,20-dione triacetate*

The complex [CH₃CO]⁺SbCl₆⁻ is prepared by adding 0.6 cc. of acetyl chloride to a solution of 1.2 cc. of antimony pentachloride in 7 cc. of carbon tetrachloride externally cooled with ice and stirring at 0° C. for 45 minutes. The precipitate is dissolved in 8 cc. of nitromethane to the solution externally cooled to −15° C. 1 g. of Δ¹,⁴-pregnadiene-11β,17α,21-triol-3,20-dione 21-acetate is added. The mixture is kept for five hours at −15° C. then 4 g. of sodium acetate in 10 cc. of water are added and the temperature is allowed to rise.

The extraction is carried out with chloroform and the organic layer is washed with water and dried over anhydrous sodium sulphate. The solvent is distilled off under reduced pressure and the residue dissolved in benzene is chromatographated on 30 g. of activated magnesium silicate. The fractions obtained by elution with benzene-ethylic ether (80:20) are collected and by recrystallization from acetone and petroleum ether 0.300 g. of Δ¹,⁴-pregnadiene-11β,17α,21-triol-3,20-dione triacetate, melting at 97–103° C., are obtained.

$\lambda_{max}$, 244.5 m$\mu$, $\epsilon$, 19,700; $[\alpha]_D^{24}$=+66.6 (CHCl₃)

By operating in the same manner as described above, but employing as solvent dichloroethane instead of carbon tetrachloride, analogous results are achieved.

We claim:
1. A process for the preparation of 17α-esters of 17α-hydroxy-3-keto-Δ⁴-pregnenes with an aliphatic organic acid having from 2 to 8 carbon atoms, which comprises reacting a 17α-hydroxy-3-keto-Δ-pregnene with an acylating complex consisting of a compound selected from the group consisting of phosphorus pentachloride and antimony pentachloride and of an acyl chloride derived from above-mentioned organic acids, dissolved in a solvent of the group of lower nitroparaffins, at a temperature between −30° C. and room temperature for a period between 30 minutes and some hours, isolating and purifying 17α-acyloxy-3-keto-Δ⁴-pregnene so obtained.

2. A process for the preparation of 17α-esters of 17α-hydroxy-3-keto-Δ⁴-pregnenes with an aliphatic organic acid having from 2 to 8 carbon atoms, which comprises reacting a 17α-hydroxy-3-keto-Δ⁴-pregnene with an acylating complex consisting of phosphorus pentachloride and of an acyl chloride derived from above-mentioned organic acids, dissolved in a solvent of the group of lower nitroparaffins, at a temperature between −30° C. and room temperature for a period between 30 minutes and some hours, isolating and purifying 17α-acyloxy-3-keto-Δ⁴-pregnene so obtained.

3. A process for the preparation of 17α-esters of 17α-hydroxy-3-keto-Δ⁴-pregnenes with an aliphatic organic acid having from 2 to 8 carbon atoms, which comprises reacting a 17α-hydroxy-3-keto-Δ⁴-pregnene with an acylating complex consisting of antimony pentachloride and of an acyl chloride derived from above-mentioned organic acids, dissolved in a solvent of the group of lower nitroparaffins, at a temperature between −30° C. and room temperature for a period between 30 minutes and some hours, isolating and purifying 17α-acyloxy-3-keto-Δ⁴-pregnene so obtained.

4. A process for the preparation of 17α-esters of 17α-hydroxy-3-keto-Δ⁴-pregnenes with an aliphatic organic acid having from 2 to 8 carbon atoms, which comprises reacting a 17α-hydroxy-3-keto-Δ⁴-pregnene with an acylating complex consisting of a compound selected from the group consisting of phosphorus pentachloride and antimony pentachloride and of an acyl chloride derived from above-mentioned organic acids, dissolved in nitromethane, at a temperature between −30° C. and room temperature for a period between 30 minutes and some hours, isolating and purifying 17α-acyloxy-3-keto-Δ⁴-pregnene so obtained.

5. A process for the preparation of 17α-esters of 17α-hydroxy-3-keto-π⁴-pregnenes with an aliphatic organic acid having from 2 to 8 carbon atoms, which comprises reacting a 17α-hydroxy-3-keto-Δ⁴-pregnene with an acylating complex consisting of antimony pentachloride and of an acyl chloride of the above organic acid, dissolved in nitromethane, at a temperature between −30° C. and room temperature for a period between 30 minutes and some hours, isolating and purifying 17α-acyloxy-3-keto-Δ⁴-pregnene so obtained.

No references cited.

LEWIS GOTTS, *Primary Examiner.*

H. A. FRENCH, *Assistant Examiner.*